(12) United States Patent  
Holdsworth et al.

(10) Patent No.: US 8,271,927 B2
(45) Date of Patent: Sep. 18, 2012

(54) COMBINATION OF GROUND DEVICES IN WIRING HARNESS DESIGNS

(75) Inventors: Simon Edward Holdsworth, Tewkesbury (GB); Nigel Hughes, Avebury (GB); Jeffry A. Jones, West Linn, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 208 days.

(21) Appl. No.: 12/776,933

(22) Filed: May 10, 2010

(65) Prior Publication Data

US 2010/0223589 A1   Sep. 2, 2010

Related U.S. Application Data

(63) Continuation of application No. 11/758,571, filed on Jun. 5, 2007, now Pat. No. 7,735,044.

(51) Int. Cl.
*G06F 17/50* (2006.01)
(52) U.S. Cl. ............... 716/126; 716/55; 716/119
(58) Field of Classification Search .......... 716/55, 716/119, 126
See application file for complete search history.

(56) References Cited

U.S. PATENT DOCUMENTS

| | | | |
|---|---|---|---|
| 5,260,866 A | 11/1993 | Lisinski et al. | |
| 5,551,028 A | 8/1996 | Voll et al. | |
| 5,793,648 A | 8/1998 | Nagle et al. | |
| 5,801,958 A | 9/1998 | Dangelo et al. | |
| 6,110,213 A | 8/2000 | Vinciarelli et al. | |
| 6,272,387 B1 | 8/2001 | Yoon | |
| 6,457,165 B1 | 9/2002 | Ishikawa et al. | |
| 6,606,731 B1 | 8/2003 | Baum et al. | |
| 6,651,096 B1 | 11/2003 | Gai et al. | |
| 6,708,313 B2 | 3/2004 | Pfeil et al. | |
| 6,711,718 B2 | 3/2004 | Pfeil et al. | |
| 6,886,057 B2 | 4/2005 | Brewer et al. | |
| 7,107,197 B1 | 9/2006 | Shropshire | |
| 7,268,420 B2 | 9/2007 | Hirose | |
| 7,378,733 B1* | 5/2008 | Hoang et al. | 257/724 |
| 7,464,348 B1* | 12/2008 | Lockman et al. | 716/132 |
| 7,558,705 B1 | 7/2009 | Hughes et al. | |
| 2003/0079197 A1 | 4/2003 | Pannala et al. | |
| 2003/0126576 A1 | 7/2003 | Graham et al. | |
| 2004/0019399 A1 | 1/2004 | Kabasawa | |

(Continued)

OTHER PUBLICATIONS

The Free Dictionary; "Bypass"; citing Collins Discovery Encyclopedia, 1st edition, 2005, HarperCollins Publishers; retrieved from http://encyclopedia2.thefreedictionary.com on May 19, 2011.

(Continued)

*Primary Examiner* — Thuan Do
(74) *Attorney, Agent, or Firm* — Klarquist Sparkman, LLP

(57) ABSTRACT

A method can include allowing a user to place a first wiring harness design component within a wiring harness topology in a wiring harness design workspace, allowing the user to place a first plurality of ground devices within the first wiring harness design component placed in the wiring harness topology, allowing the user to request an automatic ground combination, and, in response to the user requesting an automatic ground combination, automatically applying at least one electronically stored ground combination rule to a first set of ground devices comprising a plurality of the first plurality of ground devices and automatically combining at least two of the first set of ground devices into a first combined ground device based at least in part on the applied at least one electronically stored ground combination rule.

31 Claims, 9 Drawing Sheets

U.S. PATENT DOCUMENTS

2004/0210854 A1 10/2004 Pfeil et al.
2004/0225988 A1 11/2004 Petunin et al.
2005/0044518 A1 2/2005 Petunin et al.
2005/0114821 A1 5/2005 Petunin et al.
2005/0114865 A1 5/2005 Petunin
2005/0240383 A1 10/2005 Hashima et al.
2006/0095882 A1 5/2006 Mankin et al.
2006/0101368 A1 5/2006 Kesarwani et al.
2007/0073809 A1 3/2007 Sangem et al.
2008/0082948 A1 4/2008 Boose
2008/0301613 A1 12/2008 Holdsworth et al.
2008/0307382 A1 12/2008 Holdsworth et al.
2009/0157209 A1 6/2009 Holdsworth

OTHER PUBLICATIONS

Weisstein, "Disjunctive Normal Form"; retrieved from http://mathworld.wolfram.com on May 19, 2011.
Park et al., "An Agent-Based Approach to Concurrent Cable Harness Design," AIEDAM, vol. 8, No. 1, 1994, 33 pages.
Holdsworth, "Wire Option Tags Study," Mentor Graphics, Oct. 2002, 7 pages.
"Derived Option Expressions on Wiring (FEAT926)," believed to be available prior to the filing date, 6 pages.
Sinz et al., "Formal Methods for the Validation of Automotive Product Configuration Data," Artificial Intelligence for Engineering and Design, vol. 17, pp. 75-97 (Jan. 2003).

* cited by examiner

COMBINATION OF GROUND DEVICES IN WIRING HARNESS DESIGNS

CROSS-REFERENCE TO RELATED APPLICATION

This is a Continuation of U.S. patent application Ser. No. 11/758,571, filed Jun. 5, 2007 now U.S. Pat. No. 7,735,044, which application is hereby incorporated by reference in its entirety.

FIELD

The disclosed technology relates to designing wiring harnesses including, but not limited to, electronic wiring harness design tools and methods of designing wiring harnesses.

BACKGROUND

Connectivity between electrical and electromechanical components (e.g., circuit packages, fuse panels, and circuit boards) can be accomplished by way of a wiring harness. A wiring harness generally refers to a collection (e.g., bundle) of one or more wires coupled together. One example of a wiring harness is a bundle of separately insulated wires that couple an automobile dashboard with the control electronics for the automobile's engine. Another example is a bundle of wires that couple an airplane cockpit to the wing assembly, engines, tail assembly, and landing gear.

Wiring harness diagrams can reduce a potentially complicated collection of wires to a readable map of components and connections. Wiring harnesses can be represented using wiring harness diagrams, which can include many physical details of the wires, couplings, and components of a particular wiring harness. Software tools, such as the Capital® Harness Systems™ (CHS) product suite by Mentor Graphics Corporation, allow a user to design, analyze, engineer, and produce wiring harnesses for various types of electrical interconnect systems.

Wiring harness designs generally involve multiple ground devices (e.g., connections to ground) and fewer ground slots in which the ground devices can be placed. It is not uncommon for a single wiring harness design to have very few ground slots or even just a single ground slot. Software tools, such as Capital® Integrator™ by Mentor Graphics Corporation, can support the design and implementation of a grounding strategy using ground devices and a ground placement algorithm that can keep ground wiring at a desired length (e.g., as short as possible).

The use of such a ground placement algorithm typically results in many ground devices being placed in a few ground slots or even just a single ground slot which, by default, usually results in many separate ground trees (e.g., plural lines) running from each grounded device back to the ground slot or slots. While a user can use software functionality (e.g., the Combine Devices functionality with the Capital® Integrator™ tool) to manually combine the ground trees to create a smaller number of ground lines that can share wiring, there exists a need for the automatic combination of ground devices and/or ground lines using electronically stored ground design rules.

SUMMARY

A wiring harness can be designed using a wiring harness design tool. The wiring harness design tool can provide a wiring harness design workspace, in which a wiring harness design can be created or provided. A wiring harness topology can also be created or provided. Within the wiring harness topology, at least one wiring harness design component (e.g., slot) can be placed. Within the electrical connection device, two or more ground devices can be placed.

In response to a user request, at least two of the ground devices can be automatically combined into a combined ground device based at least in part on at least one electronically stored ground combination rule. Ground combination rules can be created and/or modified by a user. The ground combination rules can include rules regarding attributes of the ground devices and/or attributes of ground lines that can terminate at one or more of the ground devices.

In some embodiments, two or more ground lines can be automatically combined into a combined ground line based at least in part on at least one electronically stored ground combination rule, which can be created and/or edited by a user. The automatic combination can be initiated by a user request for automatic ground line combination.

The foregoing features and aspects of the disclosed technology will become more apparent from the following detailed description, which proceeds with reference to the accompanying figures.

DETAILED DESCRIPTION

Figure 1:
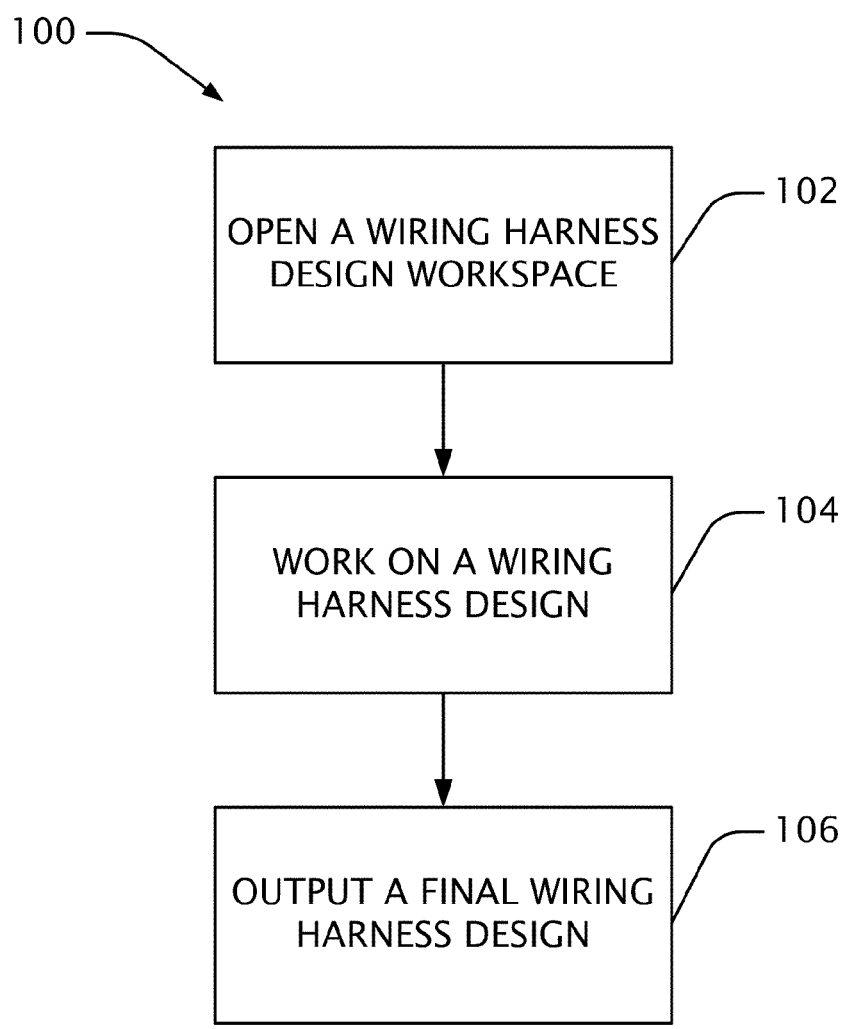
FIG. 1 shows a general method of designing wiring harnesses using an electronic wiring harness design tool.

Disclosed below are representative embodiments of methods, apparatus, and systems for designing wiring harnesses that should not be construed as limiting in any way. Instead, the present disclosure is directed toward all novel and non-obvious features and aspects of the various disclosed methods and systems, alone and in combination with one another. The disclosed technology is not limited to any specific aspect or feature, or combination thereof, nor do the disclosed methods and systems require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially can be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "determine," "analyze" and "identify" to describe the disclosed technology. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an" and "the" include the plural forms unless the context clearly dictates otherwise. Additionally, the term "includes" means "comprises." Further, the term "coupled" means electrically connected or linked and does not exclude the presence of intermediate elements between the coupled items. The phrase "and/or" can mean "and," "or," or "both."

EXEMPLARY DEFINITIONS

For purposes of this specification, a wiring harness refers to a bundle of wires that may include other components (e.g., connectors, splices, and multicores), wherein at least some of the wires terminate in at least one component such as a connector. A wire can be a standard conductor (e.g., copper) or any other type of applicable conductor (e.g., optical).

For purposes of this specification, an electronic wiring harness design tool refers to a software tool or suite that provides a user with the ability to create, modify, and/or save at least one wiring harness design. As described elsewhere within this specification, the software tool or suite can be implemented in one or more tangible computer readable media and/or as a computer program product.

For purposes of this specification, a wiring harness design workspace refers to a partial or complete view (e.g., a topology) of the wiring harness makeup of an entity (e.g., a vehicle). One or more topologies can be implemented within a single wiring harness design workspace.

For purposes of this specification, a slot refers to a representation of a physical space or component intended to receive at least one electrical component (e.g., an electrical device or a wire). For example, a slot in an automobile wiring harness design workspace can refer to a battery intended to receive certain power-related wires (e.g., by way of a connector). A single-harness slot refers to a slot intended to attach to a single harness using one or more connectors, for example. A multi-harness slot refers to a slot that can attach to more than one harness.

For purposes of this specification, a ground slot refers to a slot primarily designated to receive and/or hold at least one ground device.

For purposes of this specification, a ground device refers to a representation of a requirement to logically connect a ground signal to a physical ground point.

For purposes of this specification, a ground connector typically has one or more cavities each intended to receive at least one ground line (e.g., wire) to provide grounding functionality for at least one corresponding electronic component.

For purposes of this specification, a ground line refers to one or more wires intended to transmit or carry a ground signal. For example, a ground line can refer to two or more wires electrically but not physically connected to each other (e.g., on two sides of a connector).

For purposes of this specification, a wiring harness design component refers to an editable component within a wiring harness design, such as a wiring harness or a slot.

For purposes of this specification, a virtual connector refers to an electronic representation, displayed within a wiring harness design workspace, of a connector.

For purposes of this specification, a constraint refers to a user-configurable requirement.

Exemplary Systems and Methods for Designing Wiring Harnesses

FIG. 1 shows a general method 100 of designing wiring harnesses using an electronic wiring harness design tool.

At 102, a user (e.g., a wiring harness designer) can open a wiring harness design workspace. This can include creating a new wiring harness design workspace or opening a previously-created wiring harness design workspace. In some embodiments, the user can open multiple wiring harness design workspaces within the same session.

At 104, the user can work on one or more wiring harness designs (e.g., wiring harness topologies) within the wiring harness design workspace. This can include creating new wiring harness designs having one or more wiring harness design components and/or viewing, analyzing, editing, and/or saving previously-created wiring harness designs. In the example, this step 104 includes the user placing multiple ground devices in a ground slot and requesting an automatic ground combination to be performed on at least two of the ground devices placed in the ground slot, wherein the automatic ground combination includes the application of at least one electronically stored ground combination rule to at least two of the ground devices.

Ground combination rules can be created and/or modified by a user according to a user-defined setting (e.g., device color or material). For example, the ground combination rules can include rules regarding attributes of the ground devices and/or attributes of ground lines that can terminate at one or more of the ground devices.

At 106, a final wiring harness design can be provided as output from the wiring harness design workspace after the user has finished working (e.g., after the automatic ground combination has been performed). Providing the final wiring harness design can include performing a synthesis operation on at least one of the one or more wiring harness designs.

Figure 2:
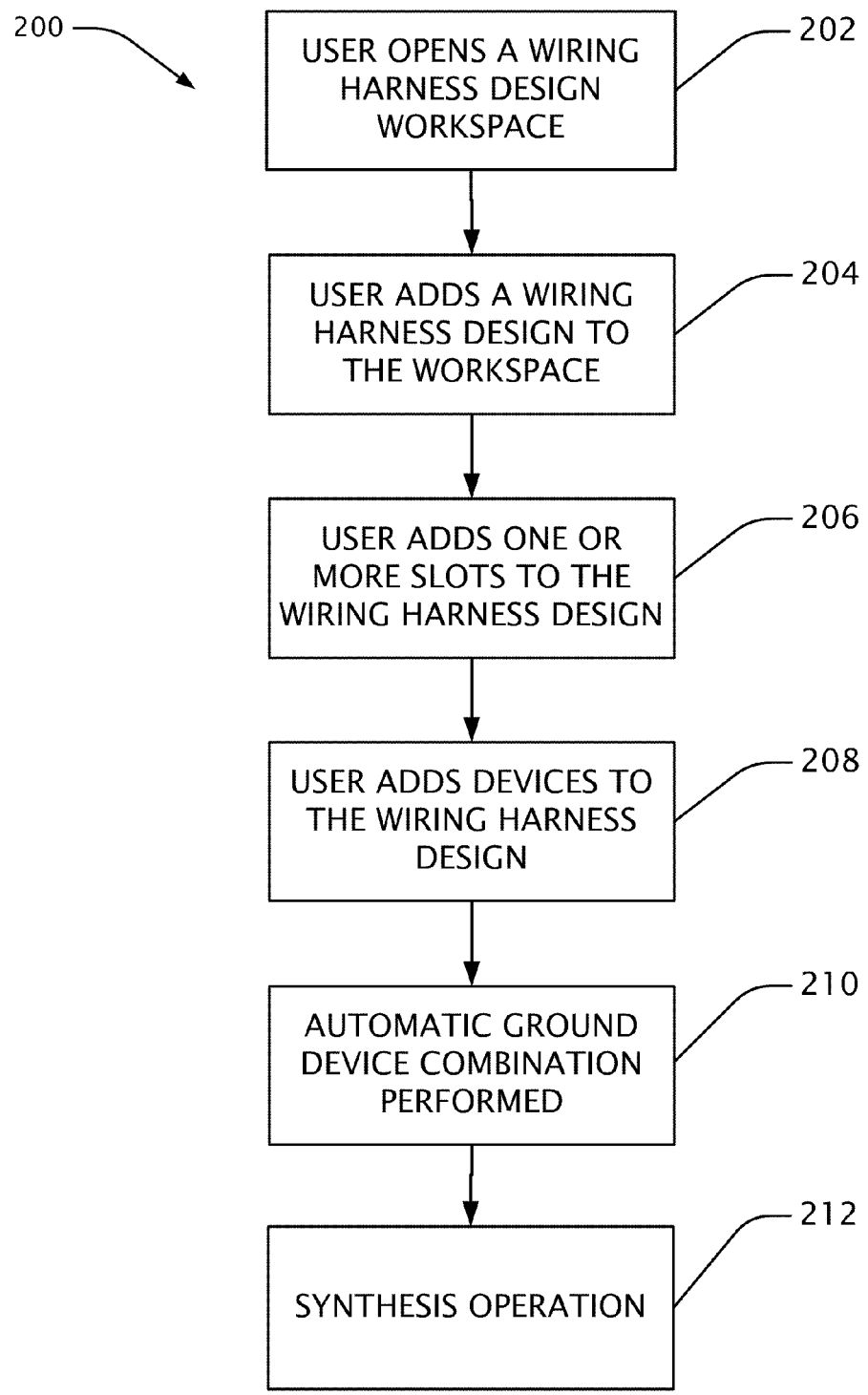
FIG. 2 shows another general method of designing wiring harnesses using an electronic wiring harness design tool.

FIG. 2 shows a general method 200 of working on a wiring harness design within a wiring harness design workspace using an electronic wiring harness design tool.

At 202, a user (e.g., a wiring harness designer) can open a wiring harness design workspace. The user can create a new wiring harness design workspace or opening a previously-created wiring harness design workspace.

At 204, the user can add a wiring harness design (e.g., a wiring harness topology such as a vehicle topology) to the wiring harness design workspace. This can include creating a wiring harness topology or importing a previously-created wiring harness topology.

At 206, the user can add at least one slot to the wiring harness design in the wiring harness design workspace.

At 208, the user can add devices to the wiring harness design. For example, the user can place one or more devices in one or more of the slots in the wiring harness design. In the example, the user places multiple ground devices in a ground slot.

At 210, the user can request an automatic ground device combination function, which can automatically combine at least two of the ground devices into a single combined ground device based at least in part on one or more ground combination rules. In some embodiments, the user can request an automatic ground combination by selecting an automatic ground combination function from a graphical user interface, for example. In alternative embodiments, the user can request an automatic ground combination by creating a ground combination rule designed to invoke an automatic ground combination function when a specified condition is met, for example.

In some embodiments, application of the automatic ground combination function can include automatically applying a first electronically stored ground combination rule to a first set of ground devices, wherein the first set of ground devices includes two or more ground devices placed in a ground slot. Application of the automatic ground combination function can also include automatically applying a second electronically stored ground combination rule to ground devices of the first set of ground devices based at least in part on results of automatically applying the first electronically stored ground combination rule.

Other electronically stored ground combination rules may be subsequently applied to the remaining ground devices, the results of which can include further narrowing the number of ground devices to be combined in a combination ground device by excluding ground devices that do not meet a certain condition of a ground combination rule, for example.

In some embodiments, an automatic ground combination function can be performed on all ground devices within a wiring harness design. In alternative embodiments, the automatic ground combination function can be performed on less than all of the ground devices within a wiring harness design. For example, an automatic ground combination function can be performed on some or all ground devices within each of less than all of the ground slots within the wiring harness design.

In some embodiments, a user can place two or more ground slots in a wiring harness design workspace and then place two or more ground devices in each of the two or more ground slots. The user can request an automatic ground combination function to be performed on less than all or all of the ground devices at and/or in each of one, more than one, or all of the ground slots.

At 212, the user can perform a synthesis operation on at least a portion of the wiring harness design in the wiring harness design workspace.

Figure 3:
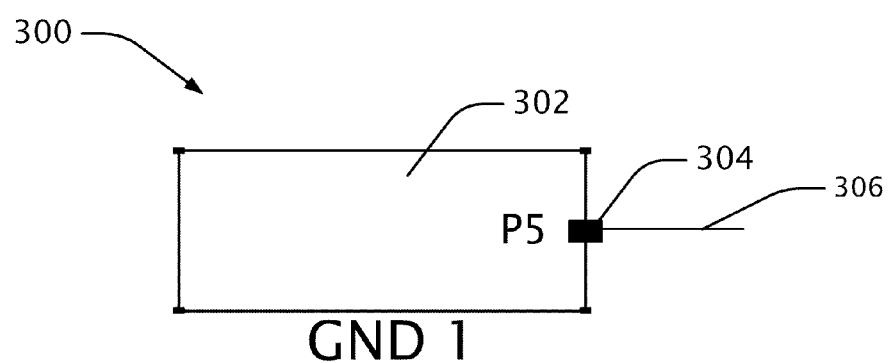
FIG. 3 shows a first exemplary ground arrangement that can be implemented within a wiring harness design.

FIG. 3 shows a ground arrangement 300 that can be implemented within a wiring harness design. A ground device 302 has a single pin 304 that can receive a single ground line 306 (e.g., wire).

Figure 4:
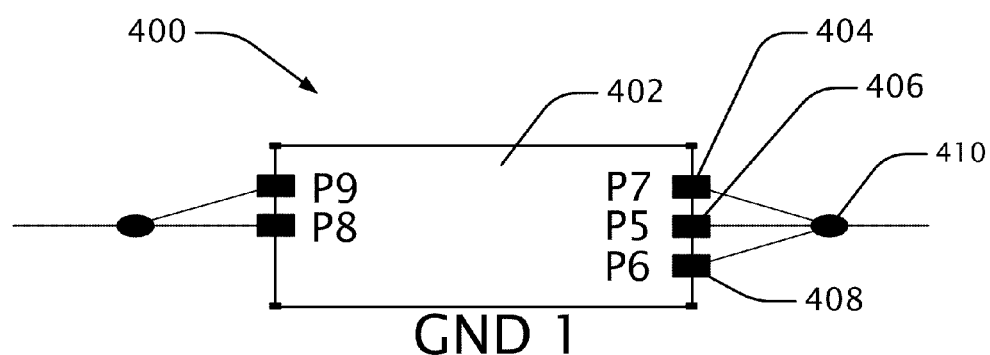
FIG. 4 shows a second exemplary ground arrangement that can be implemented within a wiring harness design.

FIG. 4 shows a ground arrangement 400 that can be implemented within a wiring harness design. A ground device 402 has multiple pins 404, 406, and 408 that can each receive a ground line (e.g., wire) that can be combined at a particular location (e.g., node or cavity) 410.

Figure 5:
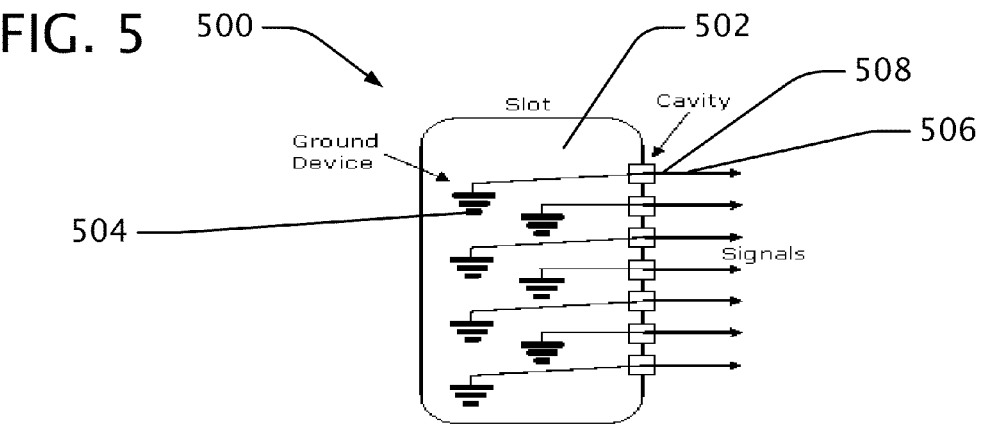
FIG. 5 shows a third exemplary ground arrangement that can be implemented within a wiring harness design.

FIG. 5 shows a ground arrangement 500 having a ground slot 502 containing multiple ground devices such as ground device 504. The ground devices can connect to ground lines at cavities in the ground slot 502. For example, the ground device 504 can connect to a ground line 506 at a cavity 508.

Figure 6:
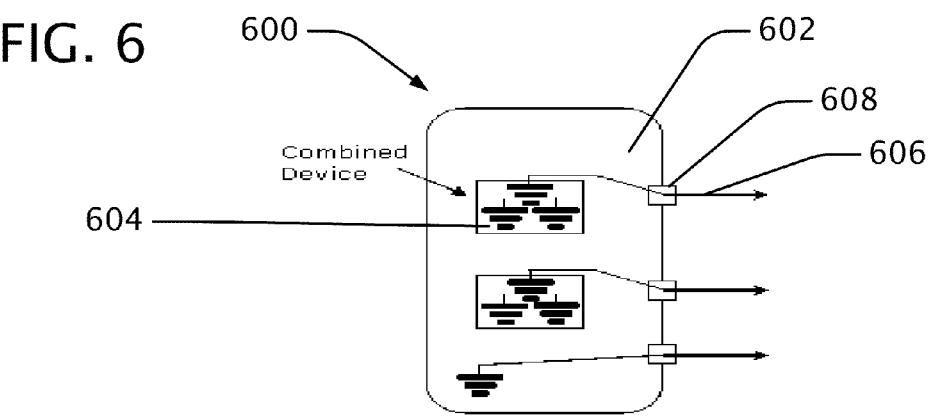
FIG. 6 shows a ground arrangement having a ground slot containing multiple ground devices, some of which have been combined into a combination ground device.

FIG. 6 shows a ground arrangement 600 having a ground slot 602 containing multiple ground devices, some of which have been combined into a combination ground device 604 by an automatic ground combination function, for example. The ground devices, including the combined ground device 604, can connect to ground lines at cavities in the ground slot 602. For example, the combined ground device 604 can connect to a ground line 606 at a cavity 608.

Figure 7:
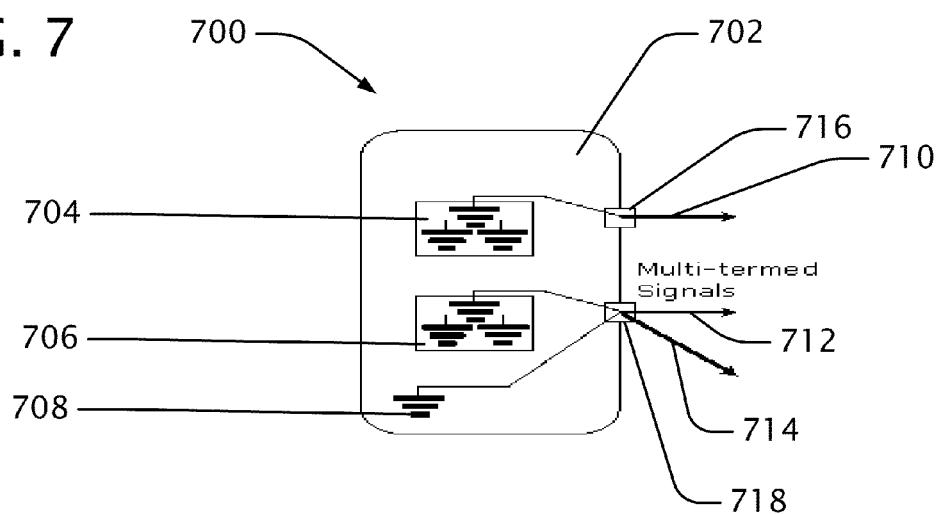
FIG. 7 shows a ground arrangement having a ground slot containing multiple ground devices, some of which have been combined into a first combination ground device and some of which have been combined into a second combination ground device.

FIG. 7 shows a ground arrangement 700 having a ground slot 702 containing multiple ground devices, some of which have been combined into a first combination ground device 704 by an automatic ground combination function and some of which have been combined into a second combination ground device 706 by the automatic ground combination function, for example. One ground device 708 has not been combined with any other ground device in the example.

The ground devices, including the combined ground devices 704 and 706 and the ground device 708, can connect to ground lines that terminate at cavities in the ground slot 702. For example, the combined ground device 704 can connect to a ground line 710 at a cavity 716. Two ground lines 712 and 714 can be mapped to a cavity 718, where the lines connect to the combination ground device 706 and the non-combined ground device 708, respectively. In some embodiments, the ground lines (e.g., 712 and 714 in the example) are bundled together but not electrically connected. For example, two ground lines each having a ground signal may terminate at the same cavity but signal integrity is maintained for the signal in each wire while passing through the cavity.

Figure 8:
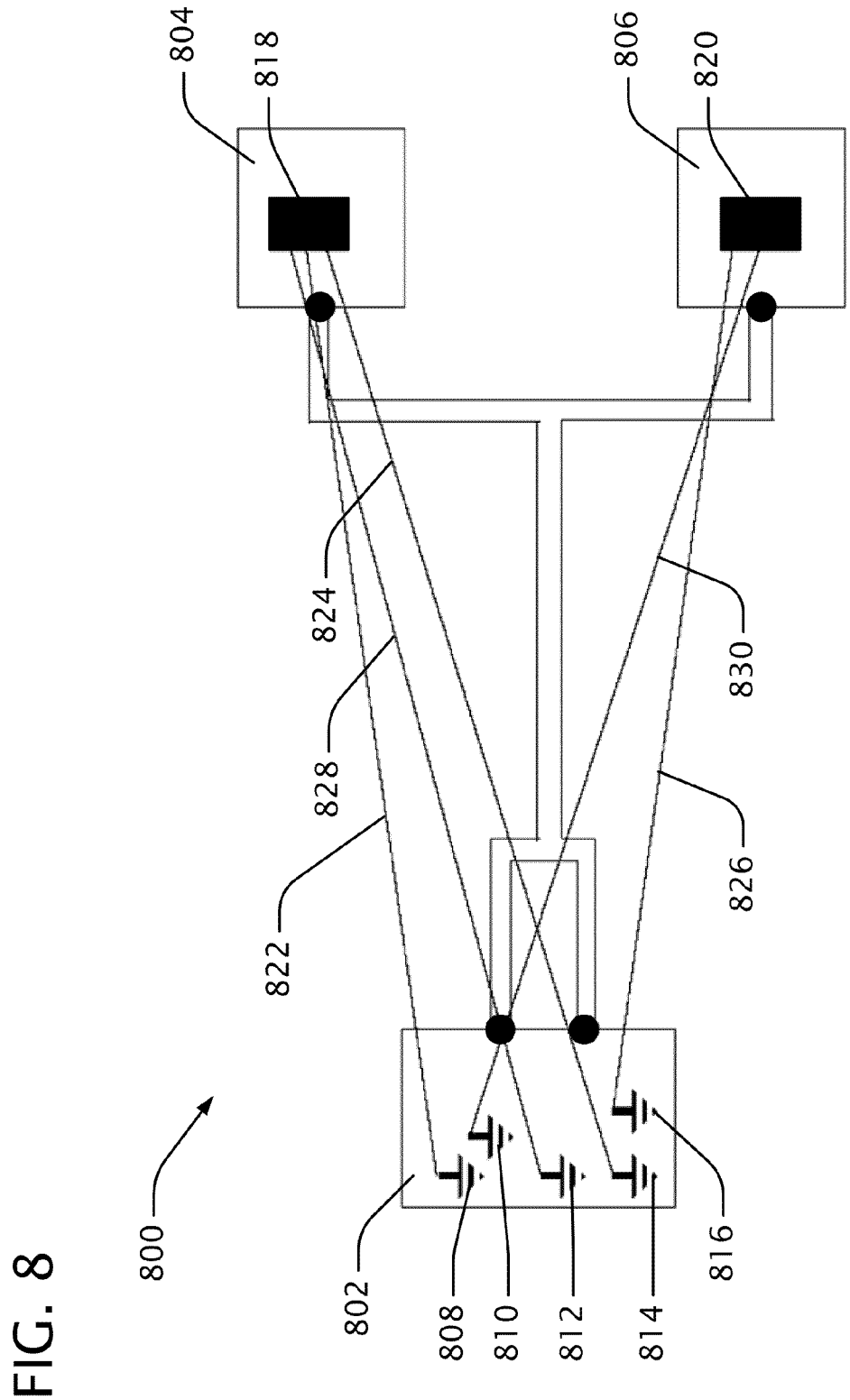
FIG. 8 shows a first exemplary topology that includes a ground slot and two other slots placed in a wiring harness design workspace.

FIG. 8 shows a topology 800 placed (e.g., created or opened) by a user in a wiring harness design workspace. The topology can include a ground slot 802 and two other slots 804 and 806 placed in the wiring harness design workspace (e.g., by a user). Ground devices 808-816 have been placed in the ground slot 802, and other devices 818 and 820 have been placed in the other slots 804 and 806, respectively (e.g., by a user).

One of the devices 818 has two ground lines 822 and 824 that are each routed directly to ground devices 808 and 814, respectively, in the ground slot 802. The routing can be performed automatically or based at least in part on user input. The other device 820 has a ground line 826 that is routed directly to a ground device 816 in the ground slot 802.

A ground line 828 from one device 818 and a ground line 830 from the other device 820 can be combined at a connector 832 (e.g., by application of an automatic ground combination function), where the combined ground line can be split into separate ground connections to two of the ground devices 810 and 812 in the ground slot 802. In the example, the ground lines 828 and 830 are bundled together but not electrically connected (e.g., they each pass through a different cavity in the connector 832), so that they may each provide for its corresponding ground signal to pass through the same connector 832 while maintaining ground signal integrity.

Figure 9:
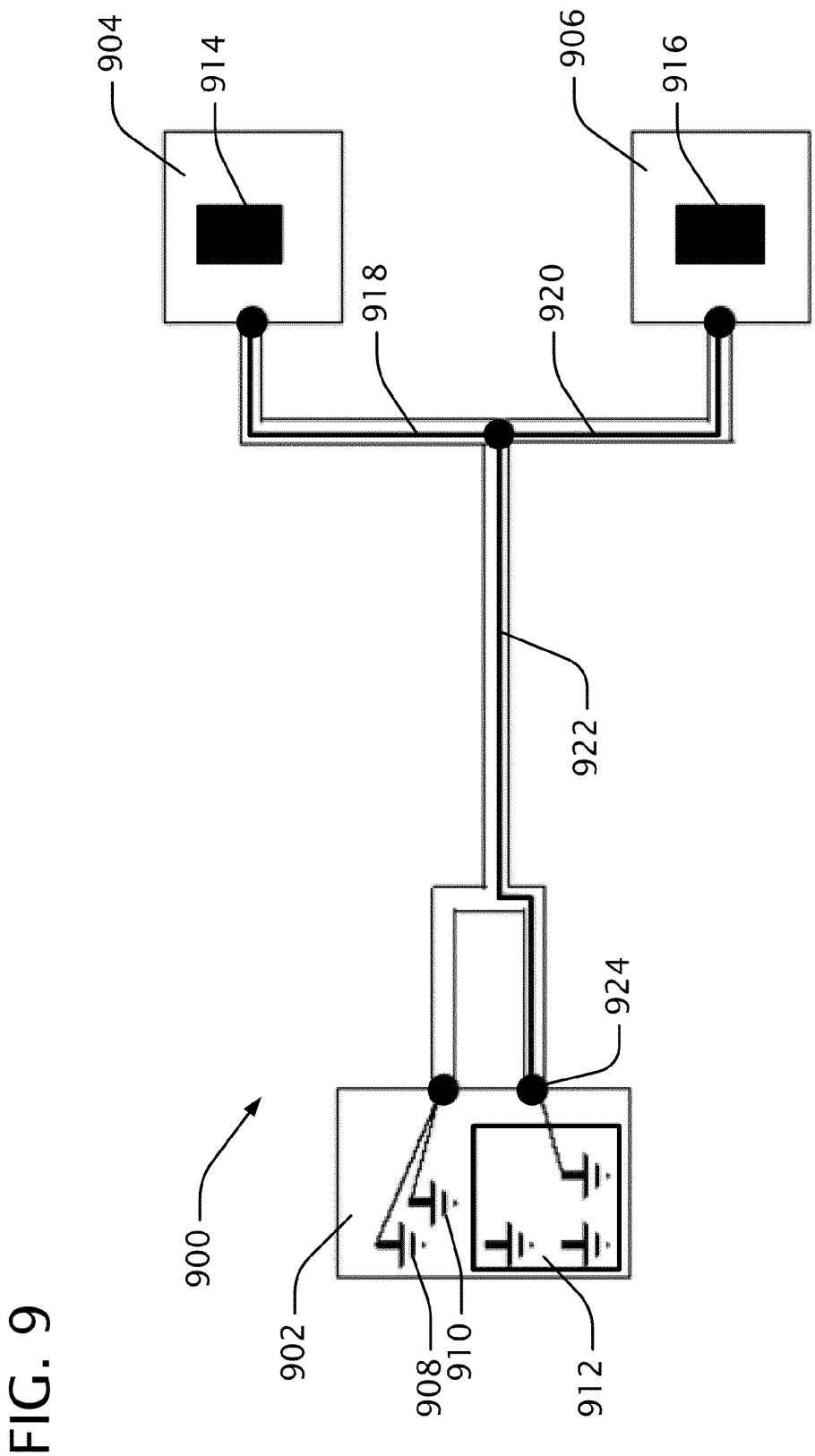
FIG. 9 shows a second exemplary topology that includes a ground slot and two other slots placed in a wiring harness design workspace.

FIG. 9 shows a topology 900 in a wiring harness design workspace. The topology includes a ground slot 902 and two other slots 904 and 906. Ground devices 908 and 910 have been placed in the ground slot 902. A combination ground device 912 is the result of an automatic combination of two or more ground devices in the ground slot 902 according to at least one electronically stored ground combination rule. Other devices 914 and 916 have been placed in the other slots 904 and 906, respectively.

One of the devices 914 has a ground line (e.g., wire) 918 that can combine (e.g., splice) with a ground line (e.g., wire) 920 from the other device 916 to form a combination ground line 922. The combination ground line can be routed to (e.g., terminate at) a connector 924, where the combination ground line 920 can electrically connect to the combination ground device 912.

Figure 10:
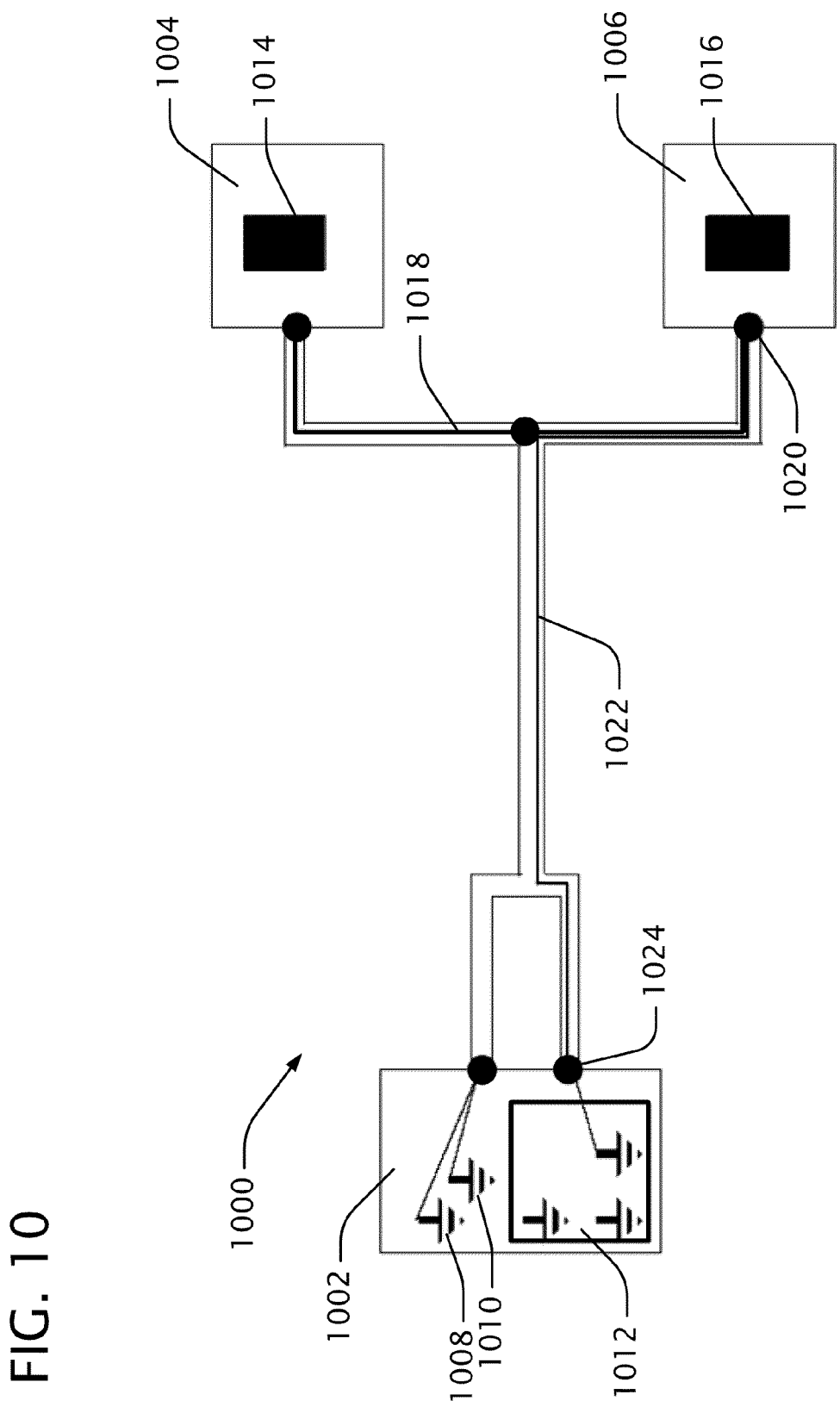
FIG. 10 shows a third exemplary topology that includes a ground slot and two other slots placed in a wiring harness design workspace.

FIG. 10 shows a topology 1000 in a wiring harness design workspace. The topology can include a ground slot 1002 and two other slots 1004 and 1006. Ground devices 1008 and 1010 have been placed in the ground slot 1002. A combination ground device 1012 is the result of an automatic combination of two or more ground devices in the ground slot 1002 according to at least one electronically stored ground combination rule, for example. Other devices 1014 and 1016 have been placed in the other slots 1004 and 1006, respectively.

One of the devices 1014 has a ground line 1018 that can combine with a ground line from the other device 1016 at a connector 1020 (e.g., by application of an automatic ground combination function). The combination ground line 1022 combining the ground line 1018 from the device 1014 and the ground line from the other device 1016 can be routed to a connector 1024, where the combination ground line 1022 can be electrically connected to the combination ground device 1012.

Figure 11:
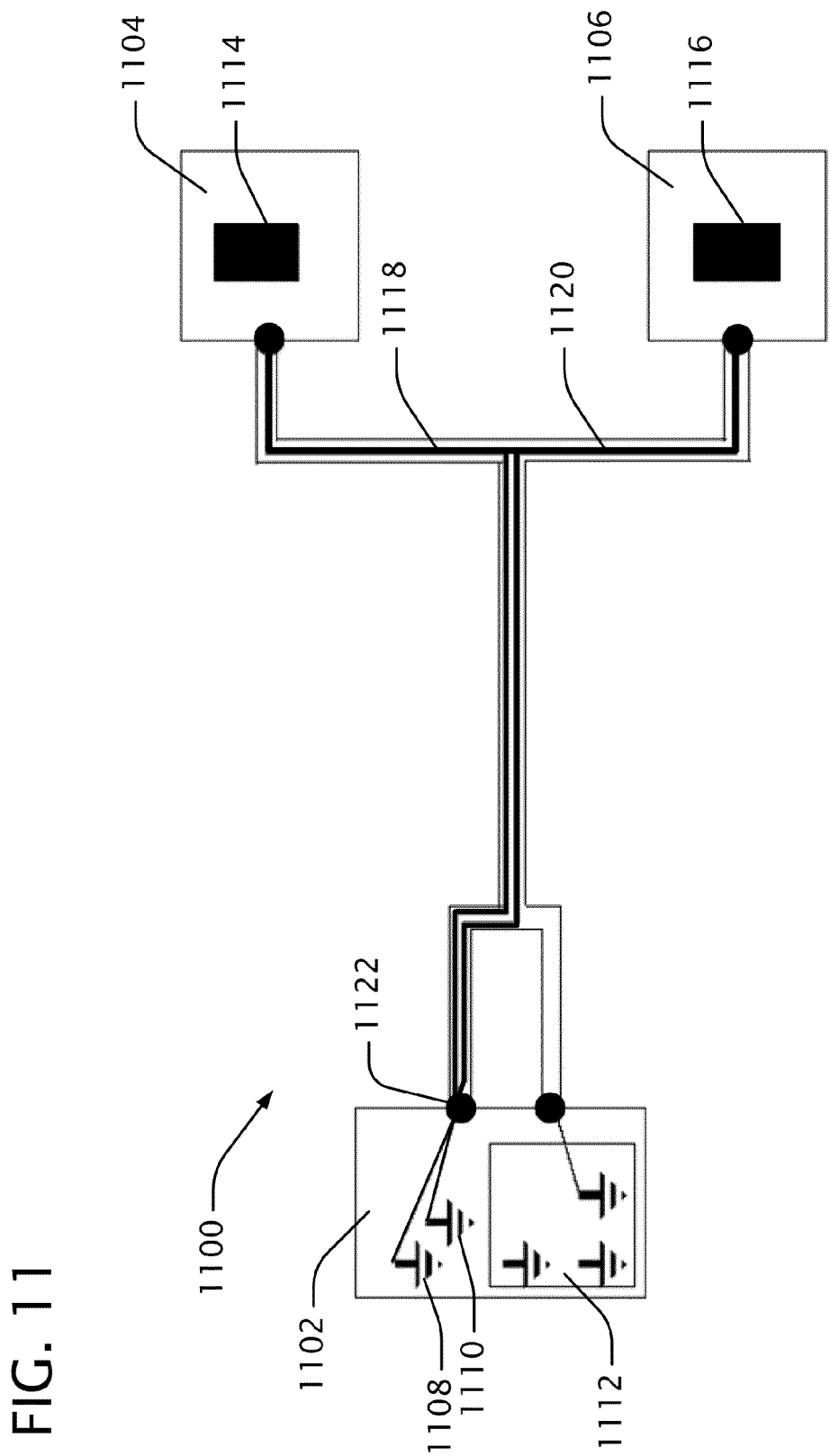
FIG. 11 shows a fourth exemplary topology that includes a ground slot and two other slots placed in a wiring harness design workspace.

FIG. 11 shows a topology 1100 in a wiring harness design workspace. The topology can include a ground slot 1102 and two other slots 1104 and 1106. Ground devices 1108 and 1110 have been placed in the ground slot 1102. A combination ground device 1112 is the result of an automatic combination of two or more ground devices in the ground slot 1102 according to at least one electronically stored ground combination rule, for example. Other devices 1114 and 1116 have been placed in the other slots 1104 and 1106, respectively.

One of the devices 1114 has a ground line 1118 that can combine with a ground line 1120 from the other device 1116 at a connector 1122 (e.g., by application of an automatic ground combination function). The combined ground line can be split into separate ground connections to two of the ground devices 1108 and 1110 in the ground slot 1102. In the example, the ground lines 1118 and 1120 are bundled together but not electrically combined such that they may each provide for its corresponding ground signal to pass through the same connector 1122 while maintaining ground signal integrity. For example, the ground signals carried by each of the ground lines 1118 and 1120 can pass through different cavities in the connector 1122.

Exemplary "Maximum Cavities Per Ground Slot Connector" Constraint

An exemplary placement constraint type for a ground slot can control the maximum number of cavities that can be added to a virtual connector (VC) in a ground slot (e.g., a Slot of type Ground) during ground (e.g., ground device) placement. This constraint can be applied, for example, when signals are mapped into ground slots during placement actions (e.g., auto and manual placement of ground devices).

A hierarchy can provide resolution in situations involving multiple active constraints (e.g., a constraint placed on a slot and a constraint placed on a wiring harness design workspace). For example, the lowest constraint in the design hierarchy can be applied first and, if there are conflicting results at that level, an error can be reported and the largest value can be returned.

A static constraint can be worded:
Maximum cavities per ground slot connector is [num]
Where "num" is a positive integer. A custom constraint type can have a companion Custom Constraint interface (e.g., called IXMaxCavitiesPerGroundConnectorConstraint, extending IXConstraint) added to the API.

Exemplary Combine Ground Devices Action

A Ground Device Combination can occur, for example, when invoked from the user interface as an action. A "Combine Ground Devices" action can be found, for example, in the Place menu and can be active following ground placement (automated or manual). This action can use a constraint on ground slots to indicate which ground devices should be combined. Ground devices placed in slots other than ground slots are generally desirably not affected by this action.

Exemplary Ground Device Combination

A Combine All Ground action can use a "Ground Device Combination" (GDC) constraint that can be placed in the hierarchy of ground slots. The constraint can use the properties and attributes of a ground device and its signal(s) to determine if it can be combined with one or more "mate devices." The mate may already be part of a combined device, in which case the subject device can join the existing combination. Possible matings can be made within a given set of constraints applied, which can result in the combining of existing combined devices.

In situations where the ground device is being mated with another ground device that was previously combined into a combination, it may be desirable that the existing name of the combination be retained. When all mates are simple devices, the Custom Constraint result can allow for naming the combined device. For static constraints, the name of one of the mates can be used.

Ground signals that share a combined device's pin can be desirably combined in situations where they share the same harness. The common signal can connect to a cavity and leave some cavities unconnected.

In some embodiments, the Ground Combination feature can be set to never un-combine previously combined ground devices. Ground device combinations created, perhaps manually, prior to invoking the Ground Device Combination action will not generally be uncombined or unplaced by later modifying constraints or later placement of other ground devices.

All GDC constraints in the hierarchy of the ground slot can desirably be applied. When multiple GDC constraints exist, generally only one must be satisfied (e.g., evaluated to true) for a combination to occur.

A static constraint for Ground Combination can be:
Combine ground devices with the same [Device/Signal] (Attrname/Propname)
where Name is the specific name of a property or attribute as specified.

EXAMPLE 1

In the example, the following constraint appears on a ground slot:
Combine ground devices with the same Device Color
The Ground Devices in the Slot are as follows:
 G1—Color:red Material:Alum
 G2—Color:red Material:Gold
 G3—Color:blue Material:Alum
 G4—Color:blue
In the example, G1 and G2 will combine as they are both RED. G3 and G4 are both BLUE and as such will be combined.

EXAMPLE 2

In the example, the following constraint appears on a ground slot:
Combine ground devices with same Device Material The Ground Devices in the Slot are as follows:
  G1—Color:red Material:Alum
  G2—Color:red Material:Gold
  G3—Color:blue Material:Alum
  G4—Color:blue Material:<none>
In the example, G1 and G3 will combine as they are both Alum.

EXAMPLE 3

In the example, the following constraint appears on a ground slot:
  Combine ground devices with same Signal Material
The Ground Devices/Signals in the Slot are as follows:
  G1—Color:red—Material:Alum < > Signal COND1—Material:Alum
  G2—Color:red Material:Gold< > Signal COND2—Material:Gold
  G3—Color:blue Material:Alum < > Signal COND3—Material:<none>
  G4—Color:blue < > Signal COND4—Material:Alum
In the example, G1 and G4 will combine as they share Material Alum.

EXAMPLE 4

In the example, the following two constraints appear on a ground slot (or one on the slot and one elsewhere in the workspace):
  Combine ground devices with same Device Color
  Combine ground devices with same Device Material
The Ground Devices in the Slot are as follows:
  G1—Color:red Material:Alum
  G2—Color:red Material:Gold
  G3—Color:blue
  G4—Color:blue Material:Alum
Since only one constraint needs to be matched to allow combination in the example, all of the devices will be combined. G1 and G2 will combine as they are both RED. G3 and G4 are both BLUE and as such will be combined. Because G4 matches G1 on the second constraint (both have Material of Alum), the G1/G2 combined device will be combined with the G3/G4 device into a single combined device.

EXAMPLE 5

This example concerns devices with multiple signals. The following constraint appears on a ground slot:
  Combine ground devices with same Signal Material
The ground devices are as follows:
  G1 <pin1> Signal COND1—Material:Gold <pin2> Signal COND2—Material:Gold
  G2 <pin1> Signal COND1—Material:Alum <pin2> Signal COND2—Material:Gold
  G3 <pin1> Signal COND1—Material:Alum <pin2> Signal COND2—Material:Alum
  G4 <pin1> Signal COND1—Material:Gold <pin2> Signal COND2—Material:Alum
In the example, G2 and G4 will combine as they match Alum-Gold. In this example, the pin connection does not matter.

In some implementations, the GDC constraint type can have a companion Custom Constraint interface, called IXGroundCombinationConstraint, extending IXConstraint, added to the API. IXGroundCombinationConstraint can declare a match( ) method to take a list of ground devices (e.g., Collection<IXGround>) connected to a harness, the harness (e.g., IXHarness), as well as the slot itself (IXSlot). This match method can be called, for example, once for each harness when more than one ground device is connected to it in the slot.

The implementation of the match method should return true if there are devices on the harness that should be combined. If true is returned, the IXCombineResult will contain a list of sets of devices to be combined.

In some implementations, properties and attributes can be obtained from the IXGround API as it is a subclass of IXObject. The signals (e.g., IXSignal) can be obtained from the pin API (e.g., IXAbstractPin) of the ground device through IXGround's superclass IXAbstractPinList.

Exemplary Multi-Term Ground Signals

Placement of ground devices usually results in a signal mapping of each distinct ground signal to a separate cavity of the ground slot's virtual connectors. It may be desirable to multi-term ground signals on a single connector cavity (e.g., combine two or more ground signals at the same connector cavity). This functionality can be included in an automatic ground combination function called the "Combine Ground Devices" action.

To facilitate multi-terming, a pair of constraints can be applied to Ground Slots as follows:
  1. Multiterm Ground Devices constraint
  2. Maximum Multitermed Ground Signal constraint
These can be applied together following Ground Combination in the "Combine Ground Devices" action so that the signal not merged by the combination of ground devices can be multi-termed at a shared cavity.

A Multi-term Ground Devices (MGD) constraint can be used to determine if signals of ground devices that have been placed in a ground slot, and mapped to the same harness, can use the same connector cavity. Location of these constraints and behavior for resolving multiple active constraints are desirably consistent with the GDC constraint discussed above.

In some implementations, the static MGD constraint version can be as follows:
  Multi-term Ground Devices with the same (Device/Signal) (Propname/Attrname)
where Device/Signal refers to a ground device or ground signal and the PropName/AttrName refers to the specific name of a property or attribute as specified.

In implementations where the MGD constraint is present in the hierarchy of the ground slot, all device pins connected to the same harness with a same value of the specified property or attribute can be desirably mapped to the same cavity.

All MGD constraints in the hierarchy of the ground slot can be applied to a simple ground device until a multi-term is made or all constraints are evaluated.

A MGD constraint type can have a companion Custom Constraint interface, called IXMultitermGroundDevices Constraint, added to the API. A constraint match method can be called for each harness with more than one ground signal in a given slot. For example, IXMultitermGroundDevices Constraint can declare a match( ) method to take a list of the ground devices (e.g., Collection<IXGround>) connected to a harness, the harness (e.g., IXHarness) and the slot itself (e.g., IXSlot). Some implementations of the match method should return true if the device signals should be multi-termed with other signals. When true is returned, the result (e.g., IXMultitermSignalResult) can desirably contain a list of sets of signals to be multi-termed.

Properties and attributes of ground devices and signals can generally be accessed through the custom constraint API as with the GDC constraint discussed above.

The number of signals that can be mapped to the same cavity can be desirably limited by a Maximum Multi-term Ground Signals (MMG) constraint, for example, when it is present in the hierarchy of a ground slot.

In some embodiments, cavities that reach or exceed the maximum will not allow more signals to be multi-termed on them during Combine Ground actions.

The location of these constraints can be consistent with the MGD constraint discussed above. Behavior for resolving multiple active constraints can be consistent with other numeric constraints (e.g., the lowest in the design hierarchy wins and, if there are conflicting results at that level, an error can be reported and the largest value can be returned).

In some implementations, a static version of the MMG constraint can appear as follows:

Maximum multi-termed ground signals is (Number) where Number is a positive non-zero integer. This constraint can be applied, for example, to all cavities of the ground slot.

A custom constraint (e.g., IXMaxGroundSignalsPerMultitermConstraint) can be used to overload the match method of IXConstraint to take a slot (e.g., IXSlot). The match method can return "true" if the constraint should be applied. If true is returned, the maximum number of multi-termed signals on cavities of this slot should desirably be placed in the result (e.g., IXCountResult).

Exemplary Interfaces Added to the API

Several exemplary interfaces can be added to the API, as described below.

The following interface can be implemented for a Maximum Cavities per Ground Connector Constraint:

```
public interface IXMaxCavitiesPerGroundConnectorConstraint
extends IXConstraint
{
    /**
     * Determine if constraint applies given these objects.
     * @param slot - a ground slot
     * @param result - use to return the maximum allowable cavities
per connector
     * @return boolean - true if this constraint should apply to
this slot.
     */
    boolean match(IXSlot slot, IXCountResult result);
}
```

The following interface can be implemented for a Ground Device Combination Constraint:

```
public interface IXGroundCombinationConstraint extends
IXConstraint
{
    /**
     * Determine if constraint applies given these objects.
     * @param grounds - a list of ground devices on the
harness
     * @param harness - a harness on the slot
     * @param slot - the ground slot
     * @param result - use to return the combination data
     * @return boolean - true if there is a combination in the
result
     */
    boolean match(Collection<IXGround> grounds, IXHarness
harness,
        IXSlot slot, IXCombineDeviceResult result);
}
public interface IXCombineDeviceResult
{
    /**
     * addMates - may be called multiple times
     * @param name - name to be given to the combined
device
     * @param mates - a list of devices to be combined
     */
    void add Mates(,String name , Set<IXDevice> mates);
    /** Get mate
     * @return - a map of sets of ground devices mapped to
their collective name
     */
    Map<String, Set<IXDevice>> getMates( );
}
```

The following interface can be implemented for a Multi-term Ground Signals Constraint:

```
public interface IXMultitermGroundDevicesConstraint extends
IXConstraint
{
    /**
     * Determine if constraint applies given these objects.
     * @param grounds - a list of ground devices on the
harness
     * @param harness - a harness on the slot
     * @param slot - the ground slot
     * @param result - use to return the combination data
     * @return boolean - true if there is a combination in the
result
     */
    boolean match(Collection<IXGround> grounds, IXHarness
harness,
        IXSlot slot, IXMultitermSignalResult result);
}
public interface IXMultitermSignalResult
{
    /**
     * addMates - may be called multiple times
     * @param mates - a list of devices to be multi termed
     */
    void addMates(,Set<IXDeviceI> mates);
    /** Get mate
     * @return - a list of sets of devices to be multi-termed
     */
    Collection< Set<IXDevice>> getMates( );
}
```

The following interface can be implemented for a Maximum Multi-term Ground Signals Constraint:

```
public interface IXMaxGroundSignalsPerMultitermConstraint extends
IXConstraint
{
    /**
     * Determine if constraint applies given these objects.
     * @param slot - a ground slot
     * @param result - use to return the maximum allowable signal per
cavity
     * @return boolean - true if this constraint should apply to this slot.
     */
    boolean match(IXSlot slot, IXCountResult result);
}
```

Exemplary Additions to the User Interface

In some implementations, the constraint types described above can be added to a Constraint Selection dialog under a Placement category:

Maximum Cavities per Ground Connector Constraint
Ground Combination Constraint
Multi-term Ground Devices Constraint
Maximum Multi-termed Ground Signals Constraint These constraints can have typical static constraint choice available by default. Custom constraints can appear, if loaded as plug-ins, as with other constraint types.

A new action Auto-Combine All Grounds action can be added to the Place menu under the Combine Devices action.

Exemplary Computer Networks

The disclosed embodiments can be implemented in a wide variety of environments. For example, any of the disclosed techniques can be implemented in software comprising computer-executable instructions stored on computer-readable media (e.g., one or more CDs, volatile memory components (e.g., DRAM or SRAM), or nonvolatile memory components (e.g., hard drives)). This particular software implementation should not be construed as limiting in any way, however, as the principles disclosed herein are generally applicable to other software tools.

Such software can be executed on a single computer or on a networked computer (e.g., via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For the same reason, computer hardware is not described in further detail. For example, the disclosed embodiments can be implemented using a wide variety of commercially available computer systems and/or testing systems. Any of the disclosed methods can alternatively be implemented partially or completely in hardware (e.g., an ASIC or a PLD).

Further, wiring harness designs produced from any of the disclosed methods can be created, updated, or stored on computer-readable media (e.g., one or more CDs, volatile memory components (such as DRAM or SRAM), or nonvolatile memory components (such as hard drives)) using a variety of different data structures or formats.

Figure 12:
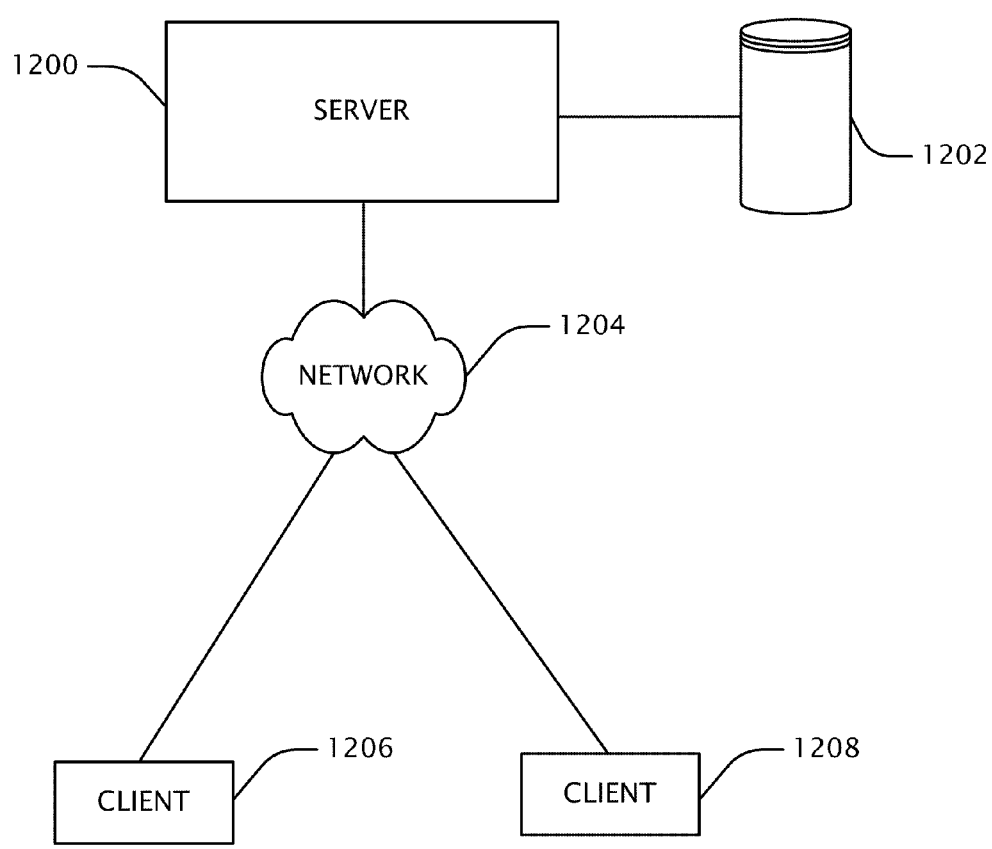
FIG. 12 is a block diagram of an exemplary computer network that can be used with the disclosed technology.

Any of the aspects of the technologies described above can be performed using a distributed computer network. FIG. 12 shows one such exemplary network. A server computer 1200 can have an associated storage device 1202 (internal or external to the server computer). For example, the server computer 1200 can be configured to display wiring harness design information according to any of the disclosed embodiments. The server computer 1200 can be coupled to a network, shown generally at 1204, which can comprise, for example, a wide-area network, a local-area network, a client-server network, the Internet, or other such network. One or more client computers, such as those shown at 1206 and 1208, can be coupled to the network 1204 using a network protocol.

Having shown and described the principles of the illustrated embodiments, it will be apparent to those skilled in the art that the embodiments can be modified in arrangement and detail without departing from such principles. In view of the many possible embodiments, it will be recognized that the illustrated embodiments include only examples and should not be taken as a limitation on the scope of the invention. Rather, the invention is defined by the following claims. We therefore claim as the invention all such embodiments that come within the scope of these claims.

We claim:

1. A method of combining ground devices in an electronic wire harness design tool, comprising:
   displaying a plurality of passive ground devices on the wire harness design tool;
   automatically combining by connecting at least two of the plurality of ground devices into a combined ground device according to at least one electronically stored ground combination rule, wherein the ground combination rule is to combine the passive ground devices having a substantially equivalent property, which includes at least one of the following: having a same color or made from a same material.

2. The method of claim 1, wherein the at least one ground combination rule comprises a user-defined rule.

3. The method of claim 1, further comprising a ground combination rule tool associated with the electronic wire harness design tool and operable to allow a user to create the at least one ground combination rule.

4. The method of claim 3, wherein the ground combination rule tool is operable to allow the user to edit at least one ground combination rule.

5. The method of claim 1, wherein the ground combination rule includes attributes of the ground devices and attributes of ground lines that terminate at the ground devices.

6. The method of claim 1, further including placing a first wiring harness design component in the electronic wiring harness design tool and placing the plurality of ground devices into the first wiring harness design component.

7. The method of claim 1, further including providing a graphical user interface in the electronic wire harness design tool in which the user can select an automatic ground combination function to initiate the automatic combining.

8. The method of claim 1, wherein the at least one ground combination rule comprises a rule setting a maximum number of the plurality of ground devices to be combined into a combination ground device.

9. The method of claim 1, further comprising performing a synthesis operation after the at least two of the first set of ground devices have been combined into a first combined ground device.

10. The method of claim 1, wherein the ground devices that are combined have an equivalent property selected from a group including: color and material.

11. The method of claim 10, wherein more than one property of the ground devices needs to be equivalent in order to combine the ground devices.

12. One or more computer readable storage devices comprising computer executable instructions for performing a method, comprising:
   providing a plurality of passive ground devices on the wire harness design tool;
   automatically combining through connecting at least two of the plurality of ground devices into a combined ground device according to at least one electronically stored ground combination rule;
   providing a ground combination rule tool associated with the wire harness design tools;
   receiving user input to create the at least one ground combination rule using the ground combination rule tool; and
   receiving user input to edit the at least one ground combination rule using the ground combination rule tool.

13. The method of claim 12, wherein the ground devices that are combined have a substantially equivalent property, which includes at least one of the following: having a same color or made from a same material.

14. The method of claim 12, wherein the stored ground combination rule includes attributes of the ground devices and attributes of ground lines that terminate at the ground devices.

15. The method of claim 12, further including placing a first wiring harness design component in the wiring harness design tool and placing the plurality of ground devices into the first wiring harness design component.

16. The method of claim 12, further including providing a graphical user interface in the electronic wire harness design tool and selecting an automatic ground combination function to initiate the automatic combining using the graphical user interface.

17. The method of claim 12, wherein the at least one ground combination rule comprises a rule setting a maximum number of the plurality of ground devices to be combined into a combination ground device.

18. The method of claim 12, further comprising performing a synthesis operation on the wiring harness topology after the at least two of the first set of ground devices have been combined into a first combined ground device.

19. A method of combining ground devices in an electronic wire harness design tool, comprising:
 displaying a plurality of passive ground devices on the wire harness design tool;
 automatically combining by connecting at least two of the plurality of ground devices into a combined ground device according to at least one electronically stored ground combination rule;
 providing a ground combination rule tool associated with the electronic wire harness design tool, which allows a user to create the at least one ground combination rule; and
 receiving user input to allow the user to edit at least one ground combination rule using the ground combination rule tool.

20. The method of claim 19, wherein the at least one ground combination rule comprises a user-defined rule.

21. The method of claim 19, wherein the ground combination rule includes attributes of the ground devices and attributes of ground lines that terminate at the ground devices.

22. The method of claim 19, further including placing a first wiring harness design component in the electronic wiring harness design tool and placing the plurality of ground devices into the first wiring harness design component.

23. The method of claim 19, further including providing a graphical user interface in the electronic wire harness design tool in which the user can select an automatic ground combination function to initiate the automatic combining.

24. The method of claim 19, wherein the at least one ground combination rule comprises a rule setting a maximum number of the plurality of ground devices to be combined into a combination ground device.

25. One or more computer readable storage devices comprising computer executable instructions for performing a method, comprising:
 providing a plurality of passive ground devices on the wire harness design tool; and
 automatically combining through connecting at least two of the plurality of ground devices into a combined ground device according to at least one electronically stored ground combination rule, wherein the at least one ground combination rule comprises a rule setting a maximum number of the plurality of ground devices to be combined into a combination ground device.

26. The method of claim 25, wherein the at least one ground combination rule comprises a user-defined rule.

27. The method of claim 25, wherein the ground combination rule includes attributes of the ground devices and attributes of ground lines that terminate at the ground devices.

28. The method of claim 25, further including placing a first wiring harness design component in the electronic wiring harness design tool and placing the plurality of ground devices into the first wiring harness design component.

29. The method of claim 25, further including providing a graphical user interface in the electronic wire harness design tool in which the user can select an automatic ground combination function to initiate the automatic combining.

30. The method of claim 25, further including providing a ground combination rule tool associated with the electronic wire harness design tool, which allows a user to create the at least one ground combination rule; and
 receiving user input to allow the user to edit at least one ground combination rule using the ground combination rule tool.

31. One or more computer readable storage devices comprising computer executable instructions for performing a method, comprising:
 providing a plurality of passive ground devices on the wire harness design tool;
 automatically combining through connecting at least two of the plurality of ground devices into a combined ground device according to at least one electronically stored ground combination rule, wherein the stored ground combination rule includes attributes of the ground devices and attributes of ground lines that terminate at the ground devices.

* * * * *